(12) United States Patent
Linde et al.

(10) Patent No.: US 12,004,447 B2
(45) Date of Patent: Jun. 11, 2024

(54) PIVOTABLE WINDROW CHUTE FOR COMBINE HARVESTER

(71) Applicant: CNH Industrial America LLC, New Holland, PA (US)

(72) Inventors: Cooper W. Linde, Lancaster, PA (US); Nathan E. Isaac, Lancaster, PA (US); Ziying Zhao, Harbin (CN)

(73) Assignee: CNH Industrial America LLC, New Holland, PA (US)

( * ) Notice: Subject to any disclaimer, the term of this patent is extended or adjusted under 35 U.S.C. 154(b) by 385 days.

(21) Appl. No.: 17/491,722

(22) Filed: Oct. 1, 2021

(65) Prior Publication Data

US 2023/0103977 A1    Apr. 6, 2023

(51) Int. Cl.
*A01D 41/12* (2006.01)
(52) U.S. Cl.
CPC .................... *A01D 41/1243* (2013.01)
(58) Field of Classification Search
CPC .............. A01D 41/1243; A01D 41/12
See application file for complete search history.

(56) References Cited

U.S. PATENT DOCUMENTS

| | | | | |
|---|---|---|---|---|
| 2,774,209 A | * | 12/1956 | Bauer | A01D 41/1243 56/473.5 |
| 3,803,821 A | * | 4/1974 | Peacock | A01D 82/00 56/192 |
| 4,892,504 A | * | 1/1990 | Scott | A01F 12/40 239/666 |
| 6,331,142 B1 | * | 12/2001 | Bischoff | A01F 12/40 460/112 |
| 6,598,812 B1 | * | 7/2003 | Matousek | A01F 12/40 239/650 |

(Continued)

FOREIGN PATENT DOCUMENTS

| | | | | |
|---|---|---|---|---|
| BE | 1021128 B1 | * | 12/2015 | ......... A01D 41/1243 |
| CA | 1285145 C | * | 6/1991 | ............. A01D 57/20 |

(Continued)

OTHER PUBLICATIONS

International Search Report and Written Opinion for Application No. PCT/US2022/045224 dated Jan. 2, 2023 (nine pages).

*Primary Examiner* — Alicia Torres
*Assistant Examiner* — Ashley A Kaercher
(74) *Attorney, Agent, or Firm* — Peter K. Zacharias; Rebecca L. Henkel; Rickard K. DeMille (57) ABSTRACT

A spreader assembly for an agricultural harvester includes a frame member and a rotor assembly attached to the frame member. The rotor assembly includes one or more rotary spreaders and a housing partially surrounding the one or more rotary spreaders. A transition hood is mounted to and/or positioned against the housing of the rotor assembly. A windrow chute is mounted to the frame member, wherein the windrow chute is pivotable about a window chute rotational axis between a deployed position and a retracted position. In the deployed position, the windrow chute blocks the transition hood to either limit or prevent removal of the transition hood in a longitudinal direction, and in the retracted position, the windrow chute permits access to and removal of the transition hood in the longitudinal direction.

17 Claims, 5 Drawing Sheets

(56) References Cited

U.S. PATENT DOCUMENTS

| | | | | |
|---|---|---|---|---|
| 7,220,179 | B2* | 5/2007 | Redekop | A01F 12/40 460/112 |
| 7,635,299 | B2* | 12/2009 | Murray | A01D 41/1243 460/111 |
| 8,070,570 | B2* | 12/2011 | Murray | A01D 41/1243 239/681 |
| 8,574,048 | B1* | 11/2013 | Farley | A01D 41/1243 460/111 |
| 8,585,475 | B2* | 11/2013 | Isaac | A01F 12/40 460/111 |
| 8,992,294 | B2* | 3/2015 | Dilts | A01D 41/1243 460/111 |
| 9,137,944 | B2* | 9/2015 | Dilts | A01D 41/1243 |
| 9,743,586 | B2* | 8/2017 | Biggerstaff | A01F 12/40 |
| 10,446,685 | B2 | 10/2019 | Mohapatra et al. | |
| 10,477,762 | B2* | 11/2019 | Desmet | A01F 17/02 |
| 10,653,069 | B2* | 5/2020 | Farley | A01F 12/40 |
| 10,674,662 | B2* | 6/2020 | Shane | A01D 41/06 |
| 11,240,958 | B2* | 2/2022 | Isaac | A01F 12/44 |
| 2007/0111766 | A1 | 5/2007 | Holmen | |
| 2009/0005137 | A1* | 1/2009 | Isaac | A01D 41/1243 460/111 |
| 2012/0270613 | A1* | 10/2012 | Isaac | A01F 12/40 460/111 |
| 2014/0024420 | A1* | 1/2014 | Farley | A01D 41/1243 460/59 |
| 2014/0066146 | A1* | 3/2014 | Dilts | A01D 41/1243 460/111 |
| 2014/0066147 | A1* | 3/2014 | Dilts | A01D 41/1243 460/111 |
| 2014/0066148 | A1* | 3/2014 | Dilts | A01D 41/1243 460/111 |
| 2014/0096498 | A1* | 4/2014 | Estock | A01D 43/06 56/192 |
| 2014/0162739 | A1* | 6/2014 | Isaac | A01D 41/1243 460/111 |
| 2014/0325953 | A1* | 11/2014 | Patterson | F16H 7/02 56/500 |
| 2015/0011274 | A1* | 1/2015 | Murray | A01D 41/1243 460/111 |
| 2015/0011276 | A1* | 1/2015 | Murray | A01F 12/00 460/111 |
| 2015/0089912 | A1* | 4/2015 | Patton | A01D 57/28 56/10.2 R |
| 2016/0135377 | A1* | 5/2016 | Ballegeer | A01F 12/40 460/112 |
| 2016/0316622 | A1* | 11/2016 | Duquesne | A01D 41/1243 |
| 2017/0367269 | A1* | 12/2017 | Fauconnier | A01F 29/12 |
| 2018/0177126 | A1* | 6/2018 | Isaac | A01D 41/1243 |
| 2018/0310477 | A1* | 11/2018 | Peterson | A01D 61/002 |
| 2018/0368319 | A1* | 12/2018 | Desmet | A01F 12/444 |
| 2019/0008091 | A1* | 1/2019 | Isaac | A01D 91/04 |
| 2019/0084764 | A1* | 3/2019 | Dilts | B65G 11/126 |
| 2019/0124849 | A1* | 5/2019 | Farley | A01F 12/444 |
| 2020/0187418 | A1* | 6/2020 | Estock | A01D 57/26 |
| 2022/0346313 | A1* | 11/2022 | Passchyn | A01D 41/1243 |
| 2023/0026898 | A1* | 1/2023 | Baes | A01F 12/40 |
| 2023/0062608 | A1* | 3/2023 | Flickinger | A01D 41/1243 |
| 2023/0086794 | A1* | 3/2023 | Van De Wege | A01D 41/1243 460/116 |
| 2023/0103977 | A1* | 4/2023 | Linde | A01D 57/30 56/192 |

FOREIGN PATENT DOCUMENTS

| | | | | |
|---|---|---|---|---|
| CN | 113575098 | A * | 11/2021 | ......... A01D 41/1243 |
| EP | 2008505 | A1 * | 12/2008 | ......... A01D 41/1243 |
| EP | 2042018 | A1 * | 4/2009 | ......... A01D 41/1243 |
| EP | 2702853 | A1 * | 3/2014 | ......... A01D 41/1243 |
| EP | 2820936 | A1 * | 1/2015 | ......... A01D 41/1243 |
| EP | 2820937 | A1 * | 1/2015 | ......... A01D 41/1243 |
| EP | 2684440 | B1 * | 9/2016 | ......... A01D 41/1243 |
| EP | 3087818 | A1 * | 11/2016 | ......... A01D 41/1243 |
| EP | 3172959 | A1 * | 5/2017 | ......... A01D 41/1243 |
| EP | 3016495 | B1 * | 12/2017 | ......... A01D 41/1243 |
| EP | 2931022 | B1 * | 5/2018 | ......... A01D 41/1243 |
| EP | 3338528 | A1 * | 6/2018 | ......... A01D 41/1243 |
| EP | 3338528 | A1 | 6/2018 | |
| EP | 3153001 | B1 * | 8/2018 | ......... A01D 41/1243 |
| EP | 3219192 | B1 * | 10/2018 | ......... A01D 41/1243 |
| EP | 3395152 | A1 * | 10/2018 | ............. A01D 41/06 |
| EP | 3424293 | A1 * | 1/2019 | ......... A01D 41/1243 |
| EP | 3338528 | B1 * | 8/2019 | ......... A01D 41/1243 |
| EP | 3262920 | B1 * | 2/2020 | ......... A01D 41/1243 |
| EP | 3666056 | A1 * | 6/2020 | ............ A01D 41/12 |
| EP | 4101284 | A1 * | 12/2022 | ......... A01D 41/1243 |
| EP | 4140282 | A1 * | 3/2023 | ......... A01D 41/1243 |
| EP | 3915353 | B1 * | 5/2023 | ............ A01D 43/073 |
| FR | 2900310 | A1 * | 11/2007 | ............. A01D 45/06 |
| WO | WO-9933333 | A1 * | 7/1999 | ......... A01D 41/1243 |
| WO | 2005102027 | A1 | 11/2005 | |
| WO | WO-2005102027 | A1 * | 11/2005 | ......... A01D 41/1243 |
| WO | WO-2011083128 | A1 * | 7/2011 | ......... A01D 41/1243 |
| WO | 2014/035822 | A1 | 3/2014 | |
| WO | WO-2016105457 | A2 * | 6/2016 | ......... A01D 41/1243 |
| WO | 2019053738 | A1 | 3/2019 | |
| WO | WO-2019053738 | A1 * | 3/2019 | |
| WO | WO-2023055930 | A1 * | 4/2023 | ............. A01D 57/30 |

* cited by examiner

PIVOTABLE WINDROW CHUTE FOR COMBINE HARVESTER

FIELD OF THE INVENTION

The present invention relates to agricultural harvesters. More specifically, the present invention relates to a pivotable windrow chute for a combine harvester.

BACKGROUND OF THE INVENTION

As is described in U.S. Pat. No. 8,992,294 to CNH America LLC (the '294 patent), which is incorporated by reference in its entirety and for all purposes, axially arranged rotary threshing or separating systems have long been in use in agricultural combines for threshing crops to separate grain from crop residue, also referred to as material other than grain (MOG). Such axially arranged systems typically include at least one cylindrical rotor rotated within a cage or concave, with the rotor and surrounding concave being oriented so as to extend forwardly to rearwardly within the combine.

During operation of the combine, crop material is fed or directed into a circumferential passage between the rotor and the concave and is carried rearwardly along a generally helical path through such passage by rotation of the rotor as grain is threshed from the crop material. The flow of crop residue remaining between the rotor and concave after threshing is typically discharged or expelled at a rear or downstream end of the rotor.

After discharge from the threshing system, the crop residue is typically directed into a crop residue distribution system located below and rearwardly of the rear end of the rotor. The crop residue distribution system typically includes a rotary beater or chopper or other apparatus that conveys and/or chops and propels the residue rearwardly towards an area within the rear end of the combine, hereinafter referred to as a distribution chamber. The crop residue provided within the distribution chamber may be (i) discharged therefrom onto a field as a windrow, (ii) directed into a rotary spreader mounted on or at the rear end of the combine that is operable for spreading the residue over a swath of a field, or (iii) both (i) and (ii).

Windrowing typically occurs when users desire to retain the crop residue for post-processing. In such cases, the residue, which may be chopped or un-chopped, is discharged from the combine, without entering the chopper/spreader, to form a windrow directly behind the combine. A windrow door is typically positioned at the rear opening and is pivotable between a closed position, wherein the crop residue is diverted into the spreader, and an open position, wherein the crop residue is directed over the spreader, through the rear opening, onto a windrow chute and onto the field. When the crop residue is to be discharged onto a field to form a windrow, it is typically preferred that the crop residue be distributed onto the windrow chute extending from the rear opening to allow for the formation of a desirable windrow shape.

Turning now to the rotary spreader mounted on or at the rear end of the combine, the rotary spreader is configured to distribute the processed crop materials or residue over a harvested field. Rotary spreaders typically include counter rotating disks or impellers for receiving all or part of the processed crop material or residue from the distribution chamber and spreading the material in a generally even side to side manner behind the harvester.

As is described in U.S. Pat. No. 8,585,475 to CNH America LLC (the '475 patent), which is incorporated by reference in its entirety and for all purposes, with some spreaders, the disks are relatively large and when not in use substantially block the rear opening of the harvesting machine, necessitating removal of the spreader assembly from the machine, or removal of the spreader disks from the spreader assembly, if it is desired not to spread crop residue. Some spreaders provide quick release mechanisms for this purpose. However, as a disadvantage, the spreader assembly, or the spreader disks are both quite large, and must be stored when not in use. The '475 patent describes a pivotably mounted spreader assembly such that the spreader assembly can be pivoted to an inoperative position, thereby eliminating the need to detach the spreader from the combine.

A transition hood may be positioned at or near the outlet of the spreaders. The transition hood is specially configured for spreading chaff in a uniform manner. While the transition hood is useful for processing chaff, it has been found that the transition hood may not be ideal for processing long straw, such as rice straw or straw that is used for drying. Therefore, when it is desired to process long straw, it is beneficial to remove the transition hood. Because the transition hood may be blocked by the windrow chute, however, removal of the transition hood can be tedious.

In view of the foregoing, it would be desirable to configure the transition hood, windrow chute and/or spreader to ease installation and removal of the transition hood.

Although various components of a combine are mentioned in the Background section, it should not be assumed that those components are admitted prior art.

SUMMARY OF THE INVENTION

According to one aspect of the invention, a spreader assembly for an agricultural harvester comprises:
  a frame member,
  a rotor assembly attached to the frame member, wherein the rotor assembly comprises one or more rotary spreaders and a housing partially surrounding the one or more rotary spreaders,
  a transition hood mounted to and/or positioned against the housing of the rotor assembly, and
  a windrow chute mounted to the frame member, wherein the windrow chute is pivotable about a window chute rotational axis between a deployed position and a retracted position, wherein in the deployed position, the windrow chute blocks the transition hood to either limit or prevent removal of the transition hood in a longitudinal direction, and in the retracted position, the windrow chute permits access to and removal of the transition hood in the longitudinal direction.

According to another aspect of the invention, a spreader assembly for an agricultural harvester comprises:
  a frame member,
  a rotor assembly attached to the frame member, wherein the rotor assembly comprises one or more rotary spreaders and a housing partially surrounding the one or more rotary spreaders,
  a windrow chute mounted to the frame member, wherein the windrow chute is pivotable about a windrow chute axis between a deployed position and a retracted position, and
  a transition hood fixed to the windrow chute, wherein in the deployed position of the windrow chute, the transition hood is positioned either on or adjacent the rotor assembly housing, and in the in the retracted position, the transition hood is spaced apart and separated from the rotor assembly housing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 6 and 7 are isometric views of the system, as viewed in a downstream direction, wherein FIG. 6 depicts a transition hood mounted in the combine whereas the transition hood is omitted in FIG. 7.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus "grain" refers to that part of the crop material that is threshed and separated from the discardable part of the crop material, which is referred to as chaff and includes straw, seeds, and other non-grain crop material.

Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream arrows shown in FIG. 1.

Figure 1:
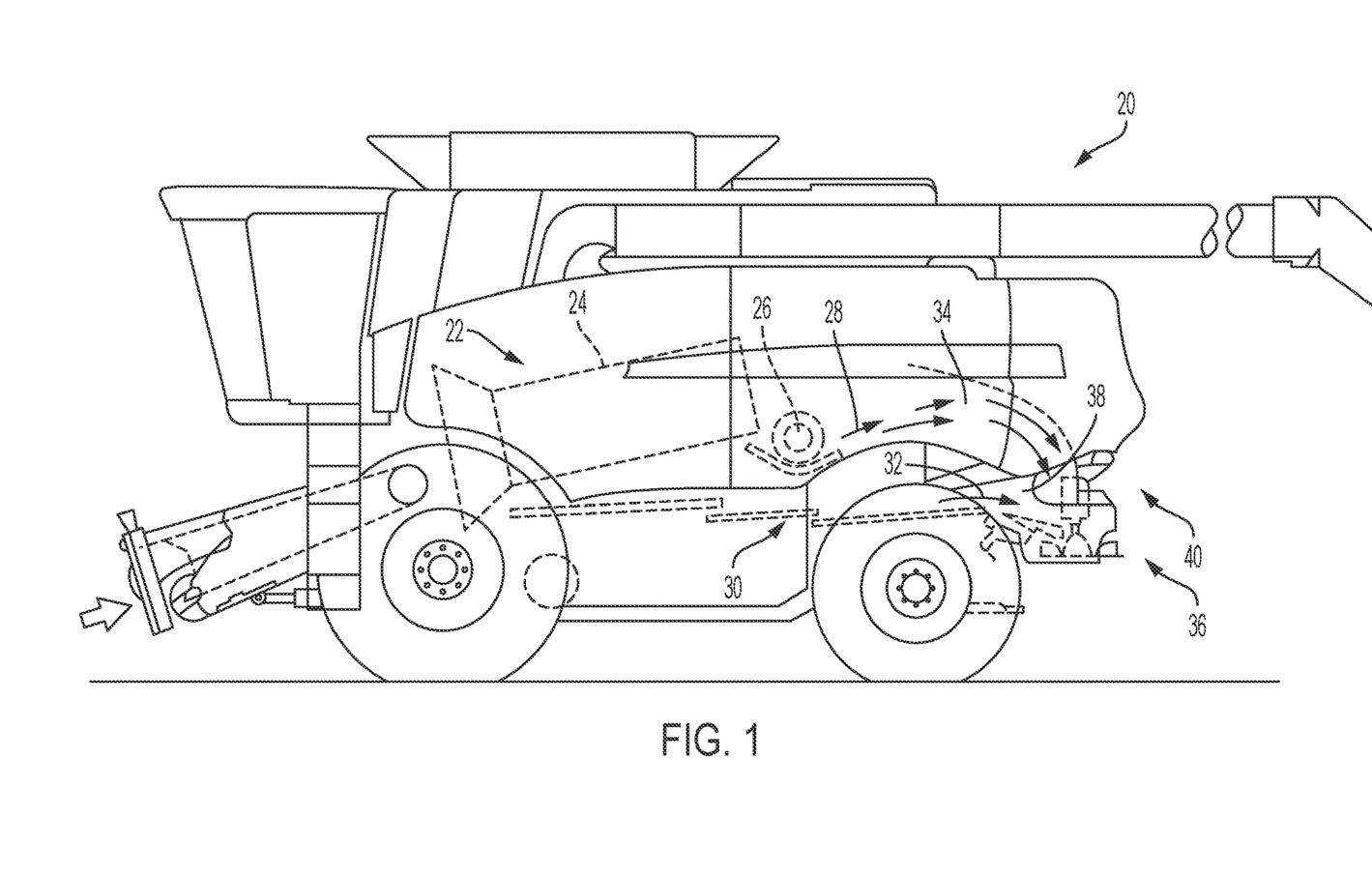
FIG. 1 depicts a side elevation view of an agricultural combine, shown schematically.

Referring now to the drawings, and more particularly to FIG. 1, which is reproduced from the '475 patent, there is shown an agricultural combine 20 representative of a wide variety of agricultural harvesting machines. Combine 20 is constructed and operable in the well-known manner and includes a threshing system 22 including a rotor 24 rotatable for separating straw 28 from the harvested crop, and a beater 26 rotatable for propelling or directing a flow or stream of straw 28 rearwardly along an airborne trajectory through a rear cavity 34 enclosed by a strawhood of combine 20, as is also well known in the art. Combine 20 also includes a cleaning system 30 for receiving the harvested crop from threshing system 22 and removing chaff 32 from the grain and directing a flow or stream of chaff 32 rearwardly through a lower region of rear cavity 34, towards a lower opening 38 in which a horizontal residue spreader assembly 36, is shown located, and which comprises part of a crop residue distribution apparatus and system 40 constructed and operable according to the present invention.

Figure 2:
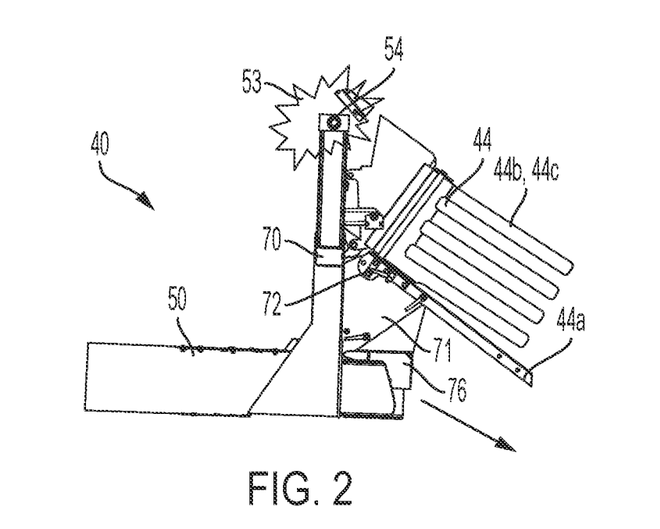
FIG. 2 depicts a crop residue distribution apparatus and system of the combine of FIG. 1, wherein the system is shown in an operative state.
Figure 3:
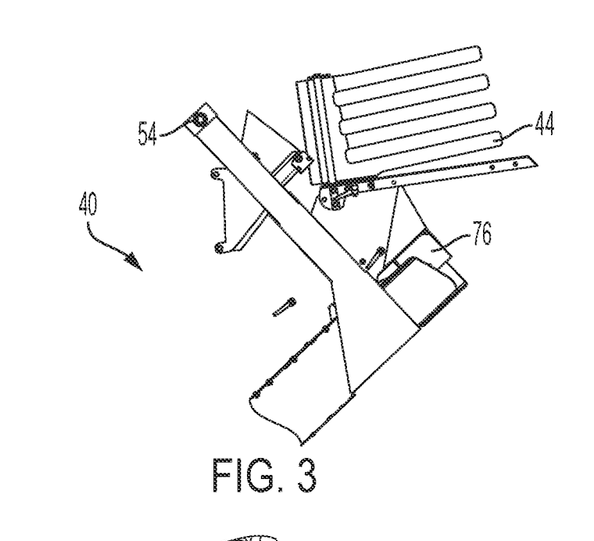
FIG. 3 depicts the system of FIG. 2 rotated to an inoperative state.

FIGS. 2-7 depict in greater detail the crop residue distribution apparatus and system 40 (system 40, hereinafter). Various components of system 40 and the combine are not shown for the purpose of simplicity. System 40 includes one or more horizontal spreaders 50 of the spreader assembly 36. Spreaders 50 having impellers 51 (FIG. 6) (also referred to herein as rotary spreaders) at least partially encased within a housing 57 (FIG. 7) are configured to distribute chaff into the field in the direction of the arrow shown in FIG. 2. Spreaders 50 are mounted to a pivotable frame 70. Frame 70 may have two opposing arms (FIG. 6) and be pivotably mounted to the strawhood 53 (a small segment of which is shown in FIG. 2 only), for example, of the combine 20. Frame 70 can be mounted to any stationary point on the combine. Frame 70 pivots about a first transverse axis 54 located at or near the top end of frame 70. The frame 70 is configured to pivot, rotate or otherwise move between an operative position (FIG. 2) and an inoperative/bypass position (FIG. 3). In the operative position of frame 70, the spreaders 50 are positioned to receive and process chaff and/or straw, whereas, in the inoperative position of the frame 70, the spreaders 50 are not positioned to receive and process chaff and/or straw. Further details in connection with the frame 70, its connection to the combine 20, and its movement between the operative and inoperative positions are described in the '475 patent.

A windrow chute 44 is also connected to frame 70. Windrow chute 44 generally comprises a flat base plate 44a, and two opposing arms 44b positioned above and on opposite sides of the flat base plate. Each arm has a series of fingers 44c. In the operative position of frame 70, windrow chute 44 registers in position with an outlet formed on the strawhood 53. In a windrow mode of the combine 20, straw is expelled through the outlet in the strawhood 53 and is delivered into the windrow chute 44, and the windrow chute distributes the straw onto the field below. Further details in connection with windrow chute 44 are disclosed in the '294 patent.

Windrow chute 44 is connected to an intermediate panel 71 that is fixedly connected to frame 70. Chute 44 moves with frame 70 between the operative and inoperative positions shown in FIGS. 2 and 3. Accordingly, chute 44 is movable along with spreaders 50. Chute 44 is pivotably connected to panel 71 about a second transverse axis 72. The second axis 72 is positioned adjacent (or in the general vicinity of) hood 76. The second axis 72 is parallel to and spaced apart from the first axis 54. Chute 44 can pivot about axis 72 between a deployed position shown in FIG. 2 and a retracted position shown in FIG. 4. The reason for pivoting chute 44 will be described hereinafter.

Figure 6:
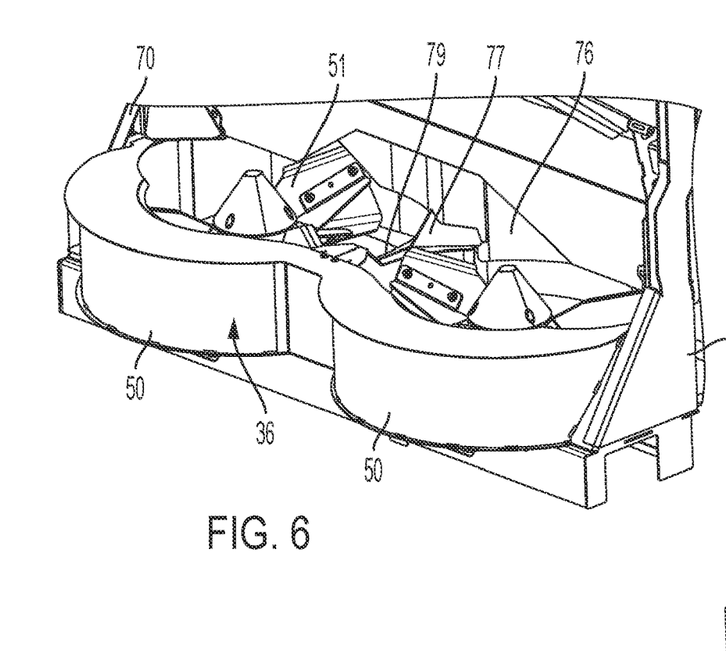

A transition hood 76 is removably mounted to spreaders 50 of spreader assembly 36. Hood 76 is a formed sheet metal panel, for example, that generally extends in the transverse direction and conforms to the geometry of the spreader assembly 36, as shown in FIG. 6. A projecting nose section 77 is positioned on the wall 79 of spreader assembly 36 positioned between the impellers of the spreaders 50. Hood 76 is positioned at the downstream end of spreaders 50 to promote the distribution of chaff from the combine 20 in a uniform manner. As best viewed by comparing FIGS. 6 and 7, the hood 76 covers an opening 59 disposed above the impellers 51 and above and along the trailing transverse edge 61 of the spreader housing 57.

Figure 5:
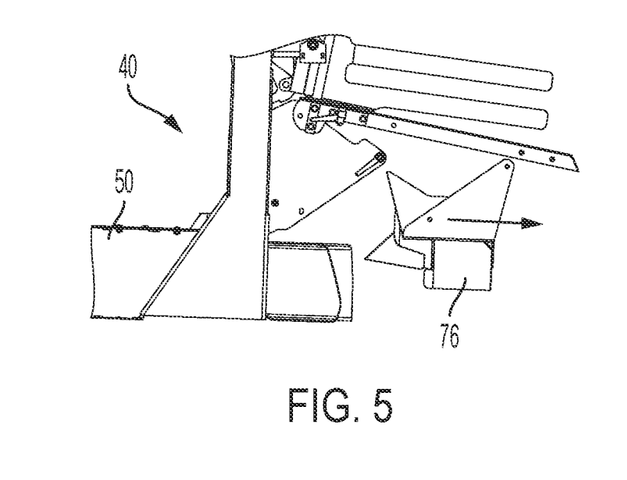
FIG. 5 depicts the process of removing the transition hood of FIG. 4.

As noted in the Background section, it has been found that while the transition hood 76 is highly useful for processing chaff, the transition hood 76 may not be ideal for processing long straw, such as rice straw or straw that is used for drying. Therefore, when it is desired to process long straw, it would be beneficial to provide a simple and convenient way for a user to easily remove the transition hood 76. As can be seen in FIG. 5, the transition hood 76 is blocked by the windrow chute 44 in the deployed position of the chute 44. Thus, it is not possible to remove the hood 76 in the longitudinal direction due to the position of the chute 44.

Figure 4:
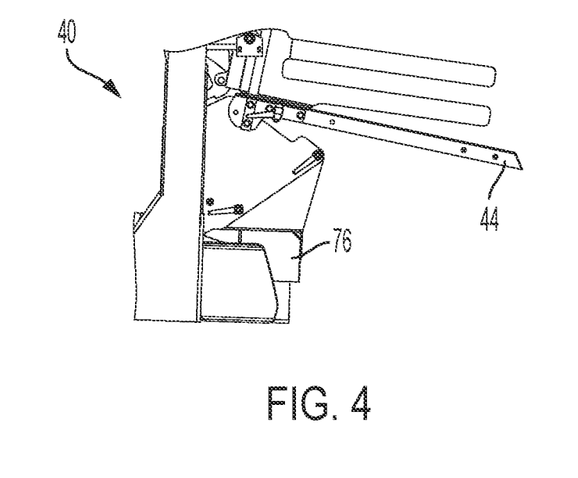
FIG. 4 depicts a windrow chute of the system of FIG. 2 rotated to a retracted position for accessing a transition hood.

Moving the chute 44 to the retracted position shown in FIG. 4 provides access to transition hood 76 and permits the manual removal of hood 76 from the combine 20. Hood 76 can be then be disconnected and moved in the longitudinal direction, which is depicted by the arrow shown in FIG. 5, in a direction away from the combine 20. Hood 76 may be releasably connected to frame 70, spreaders 50 or another surface by releasable fasteners, such as clips, clamps, wing nuts, bolts, screws, etc. such that no tools are required for disconnecting hood 76 from the combine 20. It should be understood that hood 76 can also be installed (or reinstalled) onto the combine 20 by moving chute 44 to the retracted position.

Figure 7:
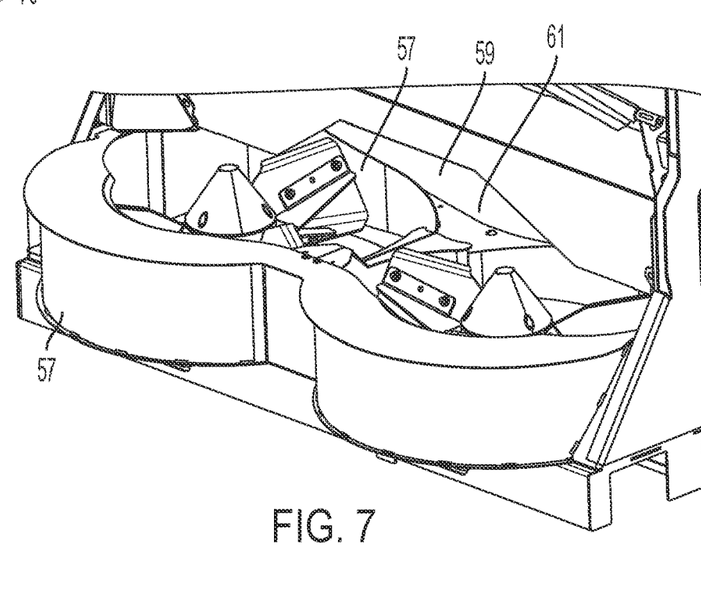

Once hood 76 is removed from combine 20, the chute 44 can be returned to the deployed position shown in FIG. 2 and the combine 20 may be utilized to process long straw, if so desired. FIG. 6 depicts hood 76 mounted to combine 20, whereas FIG. 7 depicts hood 76 removed from combine 20.

Figure 8:
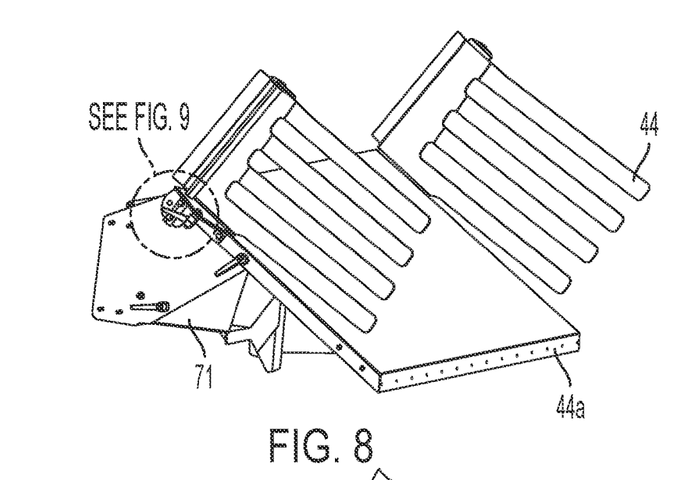
FIG. 8 depicts an isometric view of the windrow chute mounted to the intermediate panel, wherein the windrow chute is shown in the deployed position.
Figure 9:
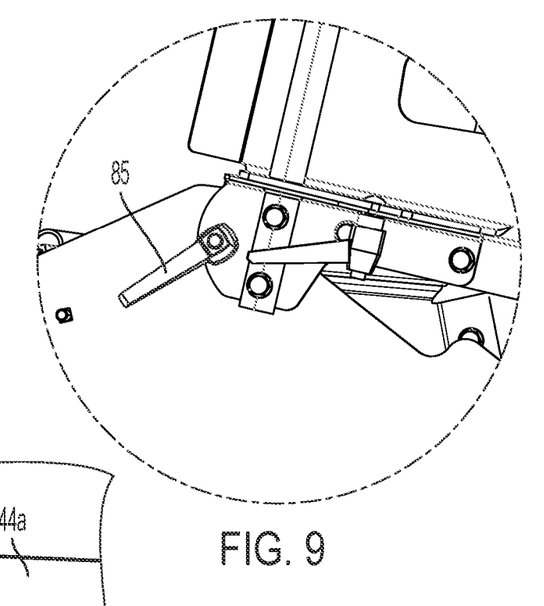
FIG. 9 is a detailed view of FIG. 8, however, the windrow chute is shown in the retracted position.
Figure 10:
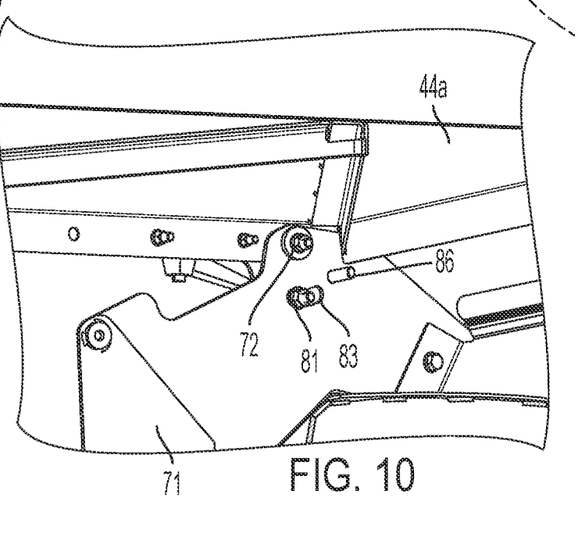
FIG. 10 depicts an isometric interior side view showing the connection between the windrow chute and the intermediate panel of the combine, wherein the windrow chute is shown in the retracted position.

FIGS. 8-10 depict the finer details of the interconnection between chute 44 and panel 71. Chute 44 is pivotably mounted to panel 71 about axis 72 by a bolt (shown), pin, shaft, bearing or fastener, as shown. Rotation of chute 44 is limited by a fastener 81 (also referred to as 'means for fastening') extending from chute 44 that is moveably positioned in a slot 83 formed in panel 71. Fastener 81 could be a bolt, pin, screw, etc.

A lockable handle 85 is mounted to the exterior surface of chute 44, and includes a pin 86 for registering with a hole in panel 71. When chute 44 is rotated to the retracted position shown in FIGS. 9 and 10, the pin 86 snaps into the hole for locking the chute 44 in the retracted (i.e., raised) position. Pushing a button on handle 85 disengages pin 86 from its hole, and chute 44 may be returned to the deployed (lowered) state shown in FIG. 8. Although not shown, another handle 85 may be positioned on the opposing side of chute 44 for locking the other side of the chute 44 in the retracted state. Handle 85 is particularly convenient because no tools are required for releasing the chute 44. It should be understood that numerous ways exist for locking rotation of chute 44 and the invention is not limited to the particular details of the handle 85. For example, handle 85 may be replaced with a fastener, bolt, wing nut, etc.

Figure 11:
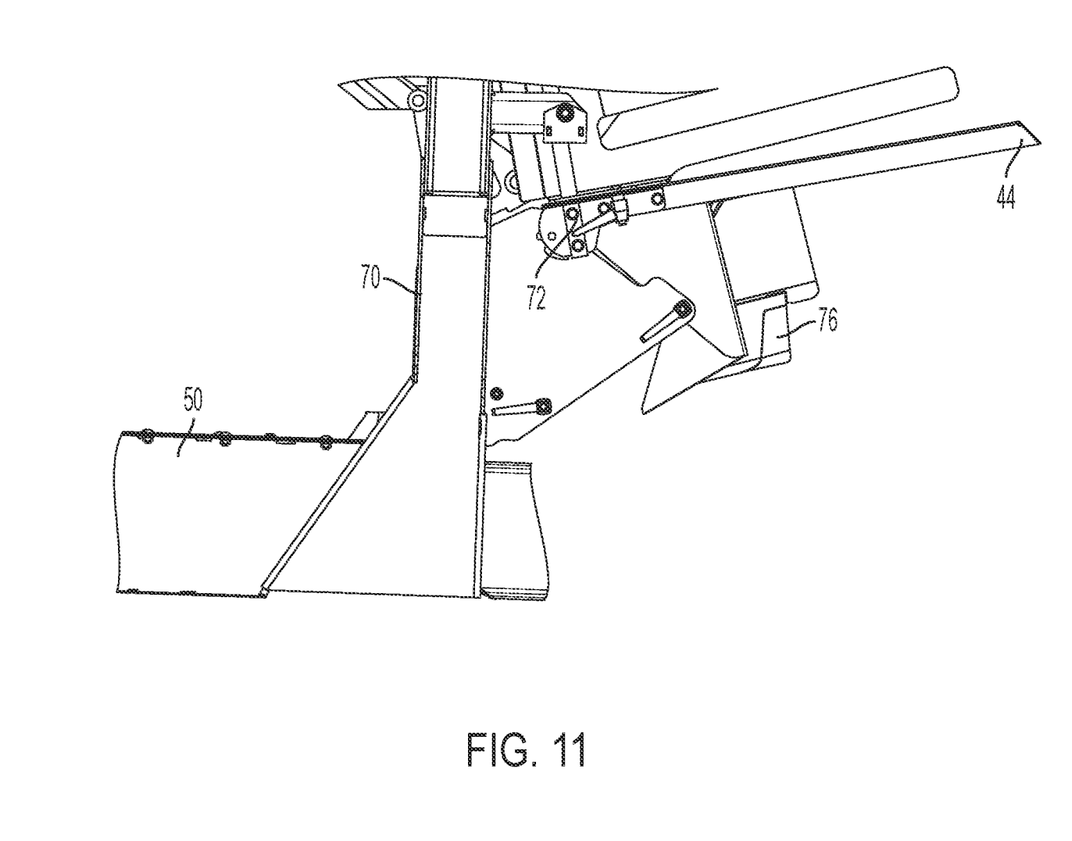
FIG. 11 depicts an alternative connection for the transition hood, wherein the hood is fixedly connected to the pivotable windrow chute, according to a second example.

FIG. 11 depicts a second example of the invention. In this example, the hood 76 is fixedly mounted to chute 44, such that hood 76 moves between the deployed and retracted positions along with chute 44. In this example, hood 76 is not removably attachable to combine 20. Rather, hood 76 and chute 44 can be moved together to a retracted and inoperative position (shown) whereupon hood 76 does not register with spreader(s) 50. As another alternative, hood 76 may be mounted on a slide or screw such that hood 76 can be moved vertically or horizontally between the deployed and retracted positions.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A spreader assembly for an agricultural harvester comprising:
   a frame member,
   a rotor assembly attached to the frame member, wherein the rotor assembly comprises one or more rotary spreaders and a housing partially surrounding the one or more rotary spreaders,
   a transition hood mounted to and/or positioned against the housing of the rotor assembly, and
   a windrow chute mounted to the frame member, wherein the windrow chute is pivotable about a windrow chute rotational axis between a deployed position and a retracted position, wherein in the deployed position, the windrow chute blocks the transition hood to either limit or prevent removal of the transition hood, and in the retracted position, the windrow chute permits access to and removal of the transition hood,
   wherein the frame member is configured to be pivotably coupled to a stationary point on the agricultural harvester about a frame member axis.

2. The spreader assembly of claim 1, wherein the transition hood comprises a sheetmetal panel.

3. The spreader assembly of claim 1, wherein the frame member axis and the windrow chute rotational axis are each oriented transversely and are also parallel to each other.

4. The spreader assembly of claim 1, wherein the frame member axis is positioned a first distance from the windrow chute that is greater than a second distance separating the windrow chute and the windrow chute rotational axis.

5. The spreader assembly of claim 1, wherein the windrow chute is configured to rotate about two separate axes.

6. The spreader assembly of claim 1, wherein an impeller of each rotary spreader is horizontally mounted.

7. The spreader assembly of claim 1, wherein the transition hood is removably mounted within the agricultural harvester.

8. The spreader assembly of claim 1, further comprising means for fastening the windrow chute in the retracted position.

9. The spreader assembly of claim 1, wherein the rotor assembly includes two of said rotary spreaders that are spaced apart from each other, and the housing partially surrounds the rotary spreaders, wherein the housing includes a wall extending between the rotary spreaders.

10. A spreader assembly for an agricultural harvester comprising:
   a frame member,
   a rotor assembly attached to the frame member, wherein the rotor assembly comprises one or more rotary spreaders and a housing partially surrounding the one or more rotary spreaders,
   a transition hood mounted to and/or positioned against the housing of the rotor assembly, and
   a windrow chute mounted to the frame member, wherein the windrow chute is pivotable about a windrow chute rotational axis between a deployed position and a retracted position, wherein in the deployed position, the windrow chute blocks the transition hood to either limit or prevent removal of the transition hood, and in the retracted position, the windrow chute permits access to and removal of the transition hood,
   wherein the rotor assembly includes two of said rotary spreaders that are spaced apart from each other, and the housing partially surrounds the rotary spreaders, wherein the housing includes a wall extending between the rotary spreaders,
   wherein the transition hood is positioned on a top side of the housing as well as the wall extending between the rotary spreaders.

11. The spreader assembly of claim 1, wherein the windrow chute is configured to register with an opening in a strawhood of the agricultural harvester.

12. The spreader assembly of claim 1, wherein the windrow chute extends in a rearward direction beyond the transition hood.

13. A combine harvester comprising the spreader assembly of claim 1.

14. A spreader assembly for an agricultural harvester comprising:
   a frame member,
   a rotor assembly attached to the frame member, wherein the rotor assembly comprises one or more rotary spreaders and a housing partially surrounding the one or more rotary spreaders,
   a windrow chute mounted to the frame member, wherein the windrow chute is pivotable about a windrow chute axis between a deployed position and a retracted position, and
   a transition hood fixed to the windrow chute, wherein in the deployed position of the windrow chute, the transition hood is positioned either on or adjacent the rotor assembly housing, and in the in the retracted position, the transition hood is spaced apart and separated from the rotor assembly housing.

15. The spreader assembly of claim 14, wherein the rotor assembly includes two of said rotary spreaders that are spaced apart from each other, and the housing partially surrounds the rotary spreaders, wherein the housing includes a wall extending between the rotary spreaders.

16. The spreader assembly of claim 15, wherein the transition hood is positionable on a top side of the housing as well as the wall extending between the rotary spreaders.

17. A combine harvester comprising the spreader assembly of claim 14.

* * * * *